Figure 1:
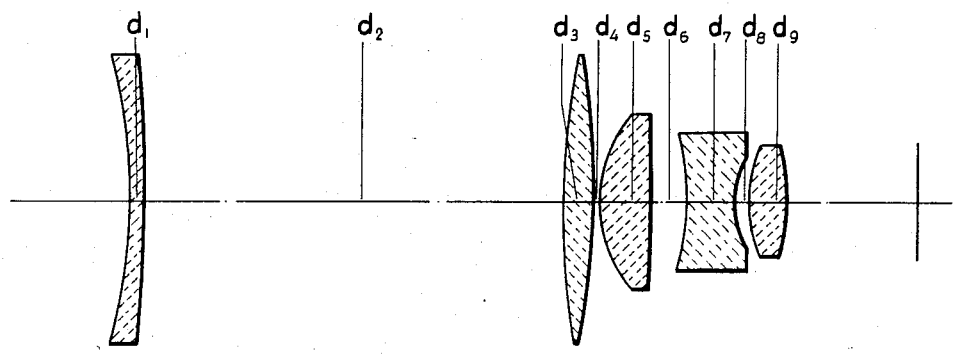

United States

Muszumanski et al.

[15] 3,694,056
[45] Sept. 26, 1972

[54] PANCRATIC PROJECTION LENS

[72] Inventors: Trude Muszumanski, Vienna; Gunter Kurz, Vosendorf, both of Austria

[73] Assignees: Karl Vockenhuber; Raimund Hauser, Vienna, Austria

[22] Filed: Aug. 4, 1970

[21] Appl. No.: 60,841

[30] Foreign Application Priority Data

Aug. 14, 1969 Austria .................... 7865/69

[52] U.S. Cl. .................... 350/184, 350/216
[51] Int. Cl. .................... G02b 15/14
[58] Field of Search .................... 350/184, 186

[56] References Cited

UNITED STATES PATENTS

| | | | |
|---|---|---|---|
| 3,466,113 | 9/1969 | Bertele | 350/184 |
| 3,274,887 | 9/1966 | Macher | 350/184 |
| 2,906,172 | 9/1959 | Klemt | 350/184 X |
| 3,227,042 | 1/1966 | Smejkal et al. | 350/184 |

*Primary Examiner*—John K. Corbin
*Attorney*—Ernest G. Montague

[57] ABSTRACT

The lens comprises a negative first unit consisting of a first lens element having a convex rear surface, a positive second lens unit consisting of a biconvex second lens element, which is displaceable along the optical axis of the lens, and a positive main lens unit consisting of a positive third lens element, a negative fourth lens element, and a final lens element. Said lens elements are arranged along the optical axis in the order stated. The main lens unit meets the condition $$2 d_8 < d_6 < 4 d_8$$

wherein $d_6$ is the vertex distance between the adjacent surfaces of said third and fourth lens elements and $d_8$ is the vertex distance between the adjacent surfaces of said fourth and final lens elements. For each of the lens units $$1.62 \quad n_d \quad 1.67$$
$$33 \quad v \quad 61$$

wherein $n_d$ is the index of refraction for the yellow helium line and $v$ is the Abbe number.

1 Claim, 2 Drawing Figures

PATENTED SEP 26 1972    3,694,056

PANCRATIC PROJECTION LENS

This invention relates to a fast pancratic projection lens, which comprises a negative forward lens unit, a positive main lens unit, and between the forward and main lens units a positive lens unit, which is displaceable in the direction of the optical axis, the forward lens unit consisting of a single lens element, preferably a meniscus, which has a convex surface facing the succeeding lens units of the lens, whereas the displaceable positive lens unit consists of a single biconvex, preferably symmetrical lens. Such a system has already been described in the patent literature, for instance, in the Printed German Application Pat. No. 1,236,816 (Dr. Bertele) and in U.S. Pat. No. 3,227,042 (assigned to Meopta) there is described a system which, although not involving a single forward lens element and a single movable lens element, is nevertheless similar in function.

It is an object of the invention to provide a pancratic projection lens which in its image-forming performance is at least equivalent to the known image-forming systems and can be manufactured at much lower costs than the known image-forming systems having a comparable performance.

This object is accomplished according to the invention in that a. the positive third lens unit consists in known manner of a three-element triplet and the vertex distance $d_6$ between the negative intermediate lens element of the triplet and the positive lens element adjacent to the displaceable lens unit meets the condition $$2 d_8 < d_6 <_4 d_8$$ in which $d_8$ is the vertex distance between the negative intermediate lens element of the triplet and the last lens element of the entire lens, b. each of the lens units meets the condition $$1.62 \leq n_d \leq 1.67$$

$$33 \leq v \leq 61$$

wherein $n_d$ is the refractive index for the yellow helium line and $v$ is the Abbé number.

The invention results in a great improvement over the projection lenses which have been defined hereinbefore and described in the literature because a design has been provided in which an absolute minimum of only five len elements constitute a system which is free of distortion and corrected for spherical, chromatic, astigmatic and comatic aberrations throughout the range in which the pancratic system can be adjusted.

Figure 2:
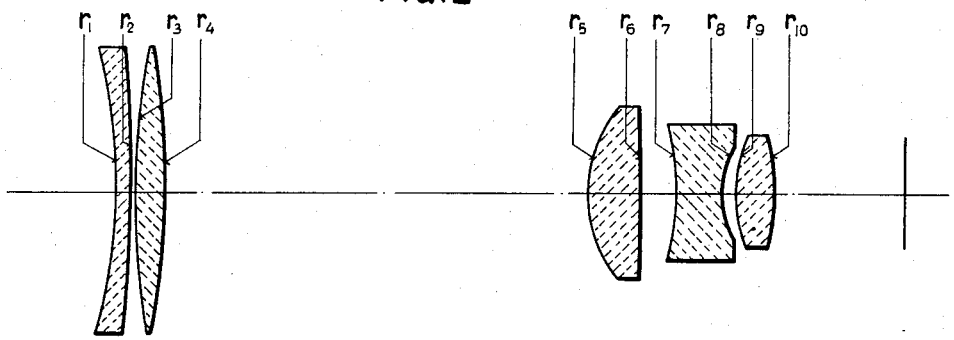

The invention will now be explained more fully with reference to an illustrative embodiment shown on the drawing, in which FIGS. 1 and 2 are axial sectional views showing the pancratic lens according to the invention in FIG. 1 in the wide-angle position and in FIG. 2 in the teleprojection position.

With reference to FIG. 2, the drawing shows a first lens element having surfaces $r_1$, $r_2$, a displaceable second lens element having surfaces $r_3$, $r_4$, a third lens element having surfaces $r_5$, $r_6$, a fourth lens element having surfaces $r_7$, $r_8$ and a final lens element having surfaces $r_9$, $r_{10}$, in that order. With reference to FIG. 1, $d_1$, $d_2$, $d_3$, $d_4$, $d_5$, $d_6$, $d_7$, $d_8$, and $d_9$ are, respectively, the vertex distances between surfaces $r_1$ and $r_2$, $r_2$ and $r_3$, $r_3$ and $r_4$, $r_4$ and $r_5$, $r_5$ and $r_6$, $r_6$ and $r_7$, $r_7$ and $r_8$, $r_8$ and $r_9$, and $r_9$ and $r_{10}$.

The ratio of the largest focal length to the smallest focal length of the lens is about 1.7 and the smallest focal length is about 2.5 times the length of the diagonal of the object to be projected. The image scale of the displaceable second lens element is in one end position approximately reciprocal to the image scale of the second lens element in the other end position. In its middle position, the displaceable lens element has an image scale of approximately 1 : 1. The resolving power and contrast of the lenses defined first hereinbefore depend to a high degree on the image-forming performance of the positive third lens unit. To reduce the aberrations introduced by this lens unit, its focal length is as large as possible and has, e.g., the same order as the largest focal length of the entire lens. To restrict the overall length of the projection lens to a reasonable value, the axially displaceable, second lens unit is also positive. This necessitates a negative stationary forward unit.

The radii, distances, thicknesses and glass data will now be described by way of example for a lens having a relative aperture of $f/1.6$ and an overall focal length $f$ of 1.000 to 1.635 millimeters.

| | | |
|---|---|---|
| $r_1 = -2.610$ | $d_1 = 0.064$ | $n_d = 1.620 \quad v = 36.4$ |
| $r_2 = -5.802$ | $d_2 = 2.126-0.009$ | |
| $r_3 = +5.263$ | $d_3 = 0.144$ | $n_d = 1.620 \quad v = 60.3$ |
| $r_4 = -5.263$ | $d_4 = 0.023-2.140$ | |
| $r_5 = +0.720$ | $d_5 = 0.266$ | $n_d = 1.620 \quad v = 60.3$ |
| $r_6 = -19.093$ | $d_6 = 0.178$ | |
| $r_7 = -1.170$ | $d_7 = 0.254$ | $n_d = 1.667 \quad v = 33.0$ |
| $r_8 = +0.489$ | $d_8 = 0.052$ | |
| $r_9 = +0.688$ | $d_9 = 0.208$ | $n_d = 1.641 \quad v = 60.1$ |
| $r_{10} = -0.891$ | | | where $r_1$ to $r_9$ are the radii of successive lens element surfaces in millimeters, $d_1$ to $d_9$ are the vertex distances between adjacent lens element surfaces in millimeters, $n_{d_{1,2}}$ to $n_{d_{9,10}}$ are the indices of refraction of lens elements having the corresponding surfaces for the yellow helium line, and $v_{1,2}$ to $v_{9,10}$ are the Abbé numbers of the lens elements having the corresponding surfaces, the relative aperture is $f/1.6$ and the overall focal length $f$ is 1.000 to 1.635 millimeters, with a tolerance of the radii of the surfaces of a lens unit corresponding to a change of the index of refraction of the lens unit up to ±10 percent, a tolerance of the thicknesses of the lens elements corresponding to a change of the focal length of any lens unit up to ±10 percent, a tolerance of the indices of refraction up to ±0.03, and a tolerance of the Abbé numbers up to ±5.

What is claimed is:

1. A pancratic projection lens, which defines an optical axis and comprises
    a negative first lens unit consisting of a first lens element having a convex rear surface,
    a positive second lens unit consisting of a biconvex second lens element, which is displaceable along said optical axis, a positive main lens unit consisting of a positive third lens element, a negative fourth lens element, and a final lens element, and in which said lens elements are arranged along said optical axis in the order stated, $r_1 = -2.610$
$d_1 = 0.064$ $n_d = 1.620$ $v = 36.4$
$r_2 = -5.802$
$d_2 = 2.126 - 0.009$
$r_3 = +5.263$
$d_3 = 0.144$ $n_d = 1.620$ $v = 60.3$
$r_4 = -5.263$
$d_4 = 0.023 - 2.140$
$r_5 = +0.720$
$d_5 = 0.266$ $n_d = 1.620$ $v = 60.3$
$r_6 = -19.093$
$d_6 = 0.178$
$r_7 = -1.170$
$d_7 = 0.254$ $n_d = 1.667$ $v = 33.0$
$r_8 = +0.489$
$d_8 = 0.052$
$r_9 = +0.688$
$d_9 = 0.208$ $n_d = 1.641$ $v = 60.1$
$r_{10} = -0.891$ where $r_1$ to $r_{10}$ are the radii of successive lens element surfaces in millimeters, $d_1$ to $d_9$ are the vertex distances between adjacent lens element surfaces in millimeters, $n_{d_{1,2}}$ to $n_{d_{9,10}}$ are the indices of refraction of lens elements having the corresponding surfaces for the yellow helium line, and $v_{1,2}$ to $v_{9,10}$ are the Abbe numbers of the lens elements having corresponding surfaces, the relative aperture is $f/1.6$ and the overall local length $f$ is 1.000 to 1.635 millimeters.

* * * * *